April 18, 1939. H. PINARD 2,154,957
PIVOTED AXLE FOR MOTOR VEHICLES
Filed May 1, 1937
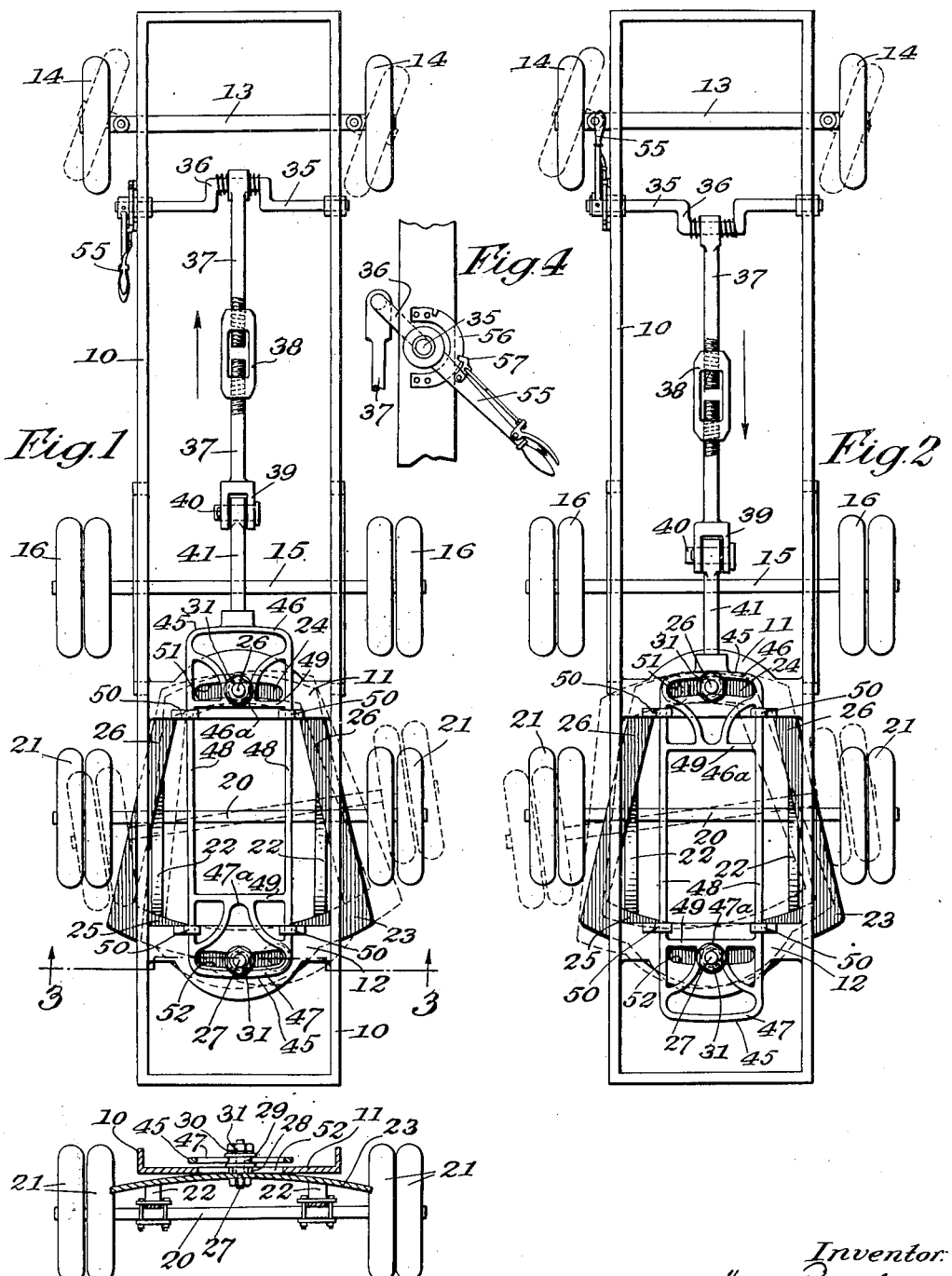
Inventor
Henry Pinard
By
Dike, Calver + Gray Attorneys.

Patented Apr. 18, 1939

2,154,957

UNITED STATES PATENT OFFICE 2,154,957

PIVOTED AXLE FOR MOTOR VEHICLES

Henry Pinard, Manchester, N. H.

Application May 1, 1937, Serial No. 140,108

4 Claims. (Cl. 280—97)

This invention relates to automotive vehicles such as trucks or buses designed to carry heavy loads and more particularly to a pivoted auxiliary axle for such vehicles.

On automotive vehicles carrying heavy loads it is at present common to have an additional set of wheels to help support the load. The additional set of wheels, however, is not free to pivot or swing but is rigidly mounted as closely as possible behind the usual rear set of wheels in tandem, there ordinarily being about four inches between the two sets of wheels. Such close spacing between the wheels is necessary to permit the vehicle to turn at all. However, with heavy loads and particularly when going down hill, the momentum gained frequently tends to force the vehicle to continue in its original direction and there is insufficient traction in the front wheels to steer the vehicle in another direction. In such situations, proper steering is difficult or impossible.

I have devised a mechanism for facilitating the steering of such heavy vehicles around turns and corners. My invention consists in providing an additional or auxiliary set of wheels mounted on the vehicle chassis behind the usual rear set of wheels, which auxiliary or following wheels are free to pivot or swing about a fixed pivot point in front of the set of following wheels. When the vehicle reverses and goes backward, I have provided means for shifting or transferring the fixed pivot point to a position in the rear of said auxiliary wheels (or in front of the auxiliary wheels when regarded from the reversed direction of travel). The auxiliary wheels thus follow automatically behind the pivot point to carry the vehicle in the direction in which it is desired to proceed. In this way the steering of heavy vehicles is greatly facilitated and many accidents due to slow response of the vehicle to its front steering wheels can be prevented. My device in effect provides the advantages of flexibility of movement of the semi-trailer type of vehicle, whether going forward or backing up, and without its disadvantages.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing:

Fig. 1 is a plan view of a vehicle chassis embodying my invention when the vehicle is going forward;

Fig. 2 is a plan view of the vehicle chassis showing my invention as it appears when the vehicle is backing up;

Fig. 3 is a vertical cross section on line 3—3 of Fig. 1;

Fig. 4 is a front elevation of the means for shifting the pivot point of the auxiliary axle.

In the drawing 10 represents the chassis frame with front axle 13, front wheels 14, rear axle 15 and rear wheels 16. These parts are of standard construction and form no part of my invention.

My invention comprises an auxiliary rear axle 20 with auxiliary rear wheels 21 suspended from leaf springs 22 mounted on a carriage 23 having front and rear end members 24 and 25 and side members 26. Front cross member 11 and rear cross member 12 have formed in them arcuate slots 51 and 52 respectively, which are described by a circle having its center in the opposite slot. Front and rear members 24 and 25 of carriage 23 carry front and rear pins 26 and 27 respectively, which extend upwardly through and slide in slots 51 and 52 respectively. Each pin 26 and 27 carries a shoe 28 to take the wear from sliding in slots 51 and 52, and a tubular roller bearing or spool 29, surmounted by a washer 30 and nut 31 threaded on pins 26 and 27. Carriage 23 is thus free to slide in the arc of a circle in slots 51 and 52 of cross members 11 and 12.

The shifting means for shifting the pivot point for the pivoted rear axle 20 comprises a cross shaft 35 journaled in the sides of frame 10 behind and closely adjacent the front axle 13, and has formed therein the offset portion 36, on which offset portion is a longitudinal shaft 37 journaled. As shown, shaft 37 is broken in two parts connected by a turn buckle 38, for providing an adjustable length to shaft 37. Shaft 37 at its rear end carries the fork 39 with pin 40 to which shaft 41 is connected and permitting shaft 37 to move slightly in a vertical plane. Shaft 41 in turn is connected to yoke member 45, which constitutes the means for holding the fixed pivot point for the auxiliary rear axle 20 and wheels 21 and for reversing it when the direction of travel of the vehicle is reversed. Yoke member 45 comprises front and rear holding members 46 and 47 generally triangular in shape and surrounding pins 26 and 27 respectively, with their apices 46a and 47a facing each other, and connected by side rods 48 and cross rods 49. Yoke member slides longitudinally of the vehicle upon cross members 11 and 12 in a groove formed by ears 50 formed on said cross members.

The shifting means for shifting the pivot point of the auxiliary axle is here shown as actuated by means of a hand lever 55 mounted on cross shaft 35 and operating on ratchet 56 by means of pawl 57, manually operated. It is obvious that as hand lever 55 is raised and pushed towards the front, it rotates cross shaft 35 and carries its offset extension 36 to the rear thereby moving shafts 37 and 41 and yoke member 45 to the rear to a similar extent. While a hand shifting lever is here shown as the actuating means, it is to be understood that the hand lever may be eliminated and the shifting done mechanically by a vacuum cylinder booster connected to the intake manifold of the engine, or by a hydraulic system or other suitable method.

It will be seen that carriage 23 is free to slide transversely of the vehicle under cross members 11 and 12 in the arcuate slots 51 and 52 formed respectively therein, but that said carriage 23 is held fixed at any one time by means of apex end 46a or 47a of front and rear holding members 46 and 47 of the yoke 45, as to provide a fixed pivot point for said carriage either in front or in the rear of said auxiliary rear axle 20 (or always in front of said auxiliary rear axle 20, when looked at from the direction in which the vehicle is going, i. e. either going forward or backing up). When the vehicle is proceeding forwardly, as shown in Fig. 1, the shifting mechanism is held pushed rearwardly and apex end 46a of holding member 46 engages pin 26 holding it firmly in the center of arcuate slot 51, and providing a fixed pivot point about which auxiliary rear axle 20, wheels 21 and carriage 23 are free to pivot, thereby automatically following any changes in the forward direction of the vehicle and greatly facilitating steering of the same. When the vehicle is to reverse its direction, however, and back up, shift lever 55 is released and pushed to the front, as shown in Fig. 2, which shifts the entire shift mechanism and yoke member 45 to the rear, releasing pin 26 from the apex end 46a of holding member 46 and permitting it to swing freely in slot 51. At the same time apex end 47a of the rear holding member 47 is caused to engage the second or rear pin 27 and hold it firmly, thereby providing a fixed pivot point for auxiliary rear axle 20, wheels 21 and carriage 23, which fixed pivot point is now in the rear of auxiliary rear axle 20, or in front of said rear axle 20 in the reversed direction in which the vehicle is now proceeding. The auxiliary wheels 21 thus automatically follow the changes of movement of the vehicle in its reversed direction as steered by front wheels 14, permitting the vehicle to be easily steered.

The distance between the usual rear wheels and my auxiliary rear wheels is variable and may be anywhere from one to ten feet or more depending upon the length of the vehicle.

My device is simple in its operation and provides great flexibility in large and heavy vehicles and makes them much more responsive to steering and should prevent many accidents now due to the defects and disadvantages of present day heavy vehicles. My device thus provides the advantages of the semi-trailer without its disadvantages. It has the same flexibility of movement when going forward, without the semi-trailer's tendency to "jack-knife" by swinging on its pivot and becoming uncontrollable when backing up, and particularly when backing down hill.

I claim:

1. In an automotive vehicle having a chassis frame, front and rear cross members attached to the rear of said chassis frame each having an arcuate slot therein, a carriage having front and rear pins for sliding in said arcuate slots, an auxiliary set of wheels mounted on said carriage, means for engaging one pin at a time on said carriage and holding it firmly to provide a fixed pivot point for said carriage and wheels, and means for shifting said engaging means from one pin to the other when the direction of travel of the vehicle is reversed.

2. In an automotive vehicle having a chassis frame, front and rear cross members attached to the rear of said chassis frame each having an arcuate slot therein, a carriage having front and rear pins for sliding in said arcuate slots, an auxiliary set of wheels mounted on said carriage, front and rear holding members engaging one pin on said carriage at a time and providing a fixed pivot point for said carriage and wheels, and means for shifting said holding members to shift said pivot point when the direction of travel of the vehicle is reversed.

3. In an automotive vehicle having a chassis frame, front and rear cross members attached to the rear of said chassis frame each having an arcuate slot therein, a carriage having front and rear pins for sliding in said arcuate slots, an auxiliary set of wheels mounted on said carriage, a front holding member for engaging the front pin on said carriage and providing a fixed pivot point in front of said auxiliary wheels when the vehicle is going forward, a rear holding member for engaging the rear pin on said carriage and providing a fixed pivot in the rear of said auxiliary wheels when the vehicle is going backward, and means for shifting said holding members and said pivot point.

4. In an automotive vehicle having a chassis frame, front and rear cross members attached to the rear of said chassis frame each having an arcuate slot therein, a carriage having front and rear pins for sliding in said arcuate slots, an auxiliary set of wheels mounted on said carriage, a central shaft mounted longitudinally on said vehicle, front and rear holding members mounted on said shaft for engaging one pin at a time on said carriage and providing a fixed pivot point for said carriage and wheels, and means for shifting said holding members to shift said pivot point when the direction of travel of the vehicle is reversed.

HENRY PINARD.